United States Patent
Kitamura

[11] Patent Number: 5,825,951
[45] Date of Patent: Oct. 20, 1998

[54] OPTICAL TRANSMITTER-RECEIVER MODULE

[75] Inventor: Naoki Kitamura, Tokyo, Japan

[73] Assignee: NEC Corporation, Tokyo, Japan

[21] Appl. No.: 775,183

[22] Filed: Dec. 30, 1996

[30]     Foreign Application Priority Data

Dec. 30, 1995  [JP]  Japan .................................. 7-353483

[51] Int. Cl.⁶ .................................................. G02B 6/28
[52] U.S. Cl. .................................. 385/45; 385/42; 385/47
[58] Field of Search .................................. 385/14, 41–48

[56]           References Cited

U.S. PATENT DOCUMENTS

| | | | |
|---|---|---|---|
| 4,860,294 | 8/1989 | Winzer et al. | 385/45 X |
| 5,016,960 | 5/1991 | Eichen et al. | 385/45 X |
| 5,333,219 | 7/1994 | Kuznetsov | 385/45 |
| 5,361,157 | 11/1994 | Ishikawa et al. | 385/45 X |
| 5,627,928 | 5/1997 | Matsuura et al. | 385/45 |
| 5,664,038 | 9/1997 | Okushima | 385/45 X |

FOREIGN PATENT DOCUMENTS

| | | |
|---|---|---|
| 3-223705 | 10/1991 | Japan . |
| 4-3002 | 1/1992 | Japan . |
| 4-81104 | 7/1992 | Japan . |
| 6-34833 | 2/1994 | Japan . |
| 6-97561 | 4/1994 | Japan . |

*Primary Examiner*—John D. Lee
*Attorney, Agent, or Firm*—Young & Thompson

[57]            ABSTRACT

Disclosed is an optical transmitter-receiver module, in which an optical waveguide with an optical dividing function is formed from a first end to a second end of a waveguide substrate, and the non-branched side of the optical waveguide is optically connected to an optical fiber at the first end of the waveguide substrate, and two optical waveguides on the branched side of the optical waveguide are optically connected to an optical transmitter and an optical receiver, respectively. A first optical waveguide of the two optical waveguides is optically connected to the optical receiver at the second end of the waveguide substrate, and a second optical waveguide of the two optical waveguides comprises a turning optical waveguide which is turned back from the second end to the first end of the waveguide substrate, and the turning optical waveguide is optically connected to the optical transmitter at the first end of the waveguide substrate.

10 Claims, 7 Drawing Sheets

OPTICAL TRANSMITTER-RECEIVER MODULE

FIELD OF THE INVENTION

This invention relates to an optical transmitter-receiver module, and more particularly to, an optical transmitter-receiver module which is used in a bidirectional optical transmission system.

BACKGROUND OF THE INVENTION

Recently, demand for bidirectional optical transmission systems has increased, and it is desired for such systems to become available for domestic use. Bidirectional transmission requires an optical transmitter and receiver. If they are individually installed, the size of the optical transmitter and receiver becomes large, thereby preventing the system from becoming popular. On the other hand, since it is expensive for optical fibers for the transmission and reception to be individually prepared, it is desirable that the bidirectional transmission is performed by using one fiber. Accordingly, it is desired that a device in which an optical transmitter and an optical receiver are integrated is employed as well as one optical fiber Furthermore, by multiplexing a light with another wavelength in the optical fiber and then demultiplexing the light, it is also possible to transmit a signal with another function such as an image signal other than the bidirectional transmission signal.

On the above background, a device in which an optical waveguide is employed has been researched to achieve small size, high integration and low cost in the device. FIG. 1 shows an example of such optical transmitter-receiver modules. In the optical transmitter-receiver module shown in FIG. 1, an optical waveguide 2 is formed on a waveguide substrate 1, and the optical waveguide 2 includes an optical branching part 3. In general, the optical branching part 3 is formed by using a Y-branch with a small propagation loss and a simple structure. To an end on the non-branched side of the optical waveguide, an optical fiber 4 is optically connected, and, to two optical waveguides branched from the optical waveguide, a semiconductor light source 5a for transmission and a semiconductor optical detector 6a for reception, respectively are optically connected. Adjacent to the semiconductor light source 5a and the semiconductor optical detector 6a, electric circuits 5b, 6b, respectively are disposed Thus, by integrally assembling these components, an optical transmitter-receiver module 9 can be obtained, therefore achieving small size and low cost.

However, in such conventional optical transmitter-receiver modules, since the semiconductor light source 5a and the semiconductor optical detector 6a, which are optically connected to the branched optical waveguides formed by the Y branch, to be closely adjacent at one side of the waveguide substrate 1 to keep the module size as small as possible, it is difficult for the module to be fabricated. In addition, since the electric circuits 5b, 6b connected with them must be closely disposed, an electrical crosstalk may occur therebetween.

If the distance of the semiconductor light source 5a and the semiconductor optical detector 6a is extended, the length of the optical waveguides has to be correspondingly, therefore resulting in failure in achieving small size and low cost required of the module. On the other hand, if the bending radius of branching optical waveguides is decreased to extend the distance of the light source 5a and the detector 6a, the device size can be kept to be small. However, as the bending radius is decreased, the confinement of light is weakened, i.e., some of the waveguided light may radiate out of the optical waveguide Therefore, it will result in increasing waveguide loss.

For the purpose of solving such problem, Japanese patent application laid-open No.6-97561(1994) discloses an optical transmitter-receiver module in which one of branched optical waveguides is turned back at the end subrace of a waveguide substrate and the turning optical waveguide is extended to the opposite end surface, so that light is introduced to the opposite side of the waveguide substrate by reflecting at the end surface.

FIG. 2 shows an example of this technique applied to the optical transmitter-receiver module shown in FIG. 1, where one of branched optical waveguides is extended to the opposite end surface of a waveguide substrate 1 to form a turning optical waveguide 7 and a semiconductor optical detector 6a is optically connected to the end of the turning optical waveguide 7. In this construction, since a semiconductor light source 5a for transmission is disposed on the opposite side of the semiconductor optical detector 6a for reception, the problem caused by the semiconductor light source and semiconductor optical detector being closely disposed as described above can be solved.

However, even if the above-mentioned technique could be adopted, since the waveguide length for reaching the semiconductor optical detector becomes longer and a waveguide loss may further be caused by the reflection at the end surface of the waveguide substrate, the waveguide loss will be increased as compared to other branched waveguides, thereby reducing the intensity of an optical signal to be detected by the semiconductor detector. Besides, the intensity of optical signal at the receiver side cannot be controlled by the module itself. As a result, the intensity of an optical signal input to the semiconductor detector will be reduced, therefore deteriorating the reception characteristic.

SUMMARY OF THE INVENTION

Accordingly, it is an object of the invention to provide an optical transmitter-receiver module which has an improved reception characteristic as well as a reduced size and optical loss.

According to the invention, provided is an optical transmitter-receiver module, in which an optical waveguide with an optical dividing function is formed from a first end to a second end of a waveguide substrate, and the non-branched side of the optical waveguide is optically connected to an optical fiber at the first end of the waveguide substrate, and two optical waveguides on the branched side of the optical waveguide are optically connected to an optical transmitter and an optical receiver, respectively, characterized in that a first optical waveguide of the two optical waveguides is optically connected to the optical receiver at the second end of the waveguide substrate, and a second optical waveguide of the two optical waveguides comprises a turning optical waveguide which is turned back from the second end to the first end of the waveguide substrate, and the turning optical waveguide is optically connected to the optical transmitter at the first end of the waveguide substrate.

In accordance with the invention, the second optical waveguide of the two branched optical waveguides is optically connected to the semiconductor light source while turning at the second end of the waveguide substrate, such that the semiconductor light source and the semiconductor optical detector are disposed at opposite ends of the waveguide substrate. Therefore, the mounting of the semiconductor light source and semiconductor optical detector onto the waveguide substrate becomes easy. Furthermore, since circuits for driving the semiconductor light source and semiconductor optical detector are located apart from each other by separately disposing these, the problem of electrical crosstalk can be solved. Moreover, though the optical loss is actually increased due to providing the turning optical waveguide, it can be compensated by adjusting the output power of the semiconductor light source optically connected to the turning optical waveguide to output a desired optical power to the optical fiber

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
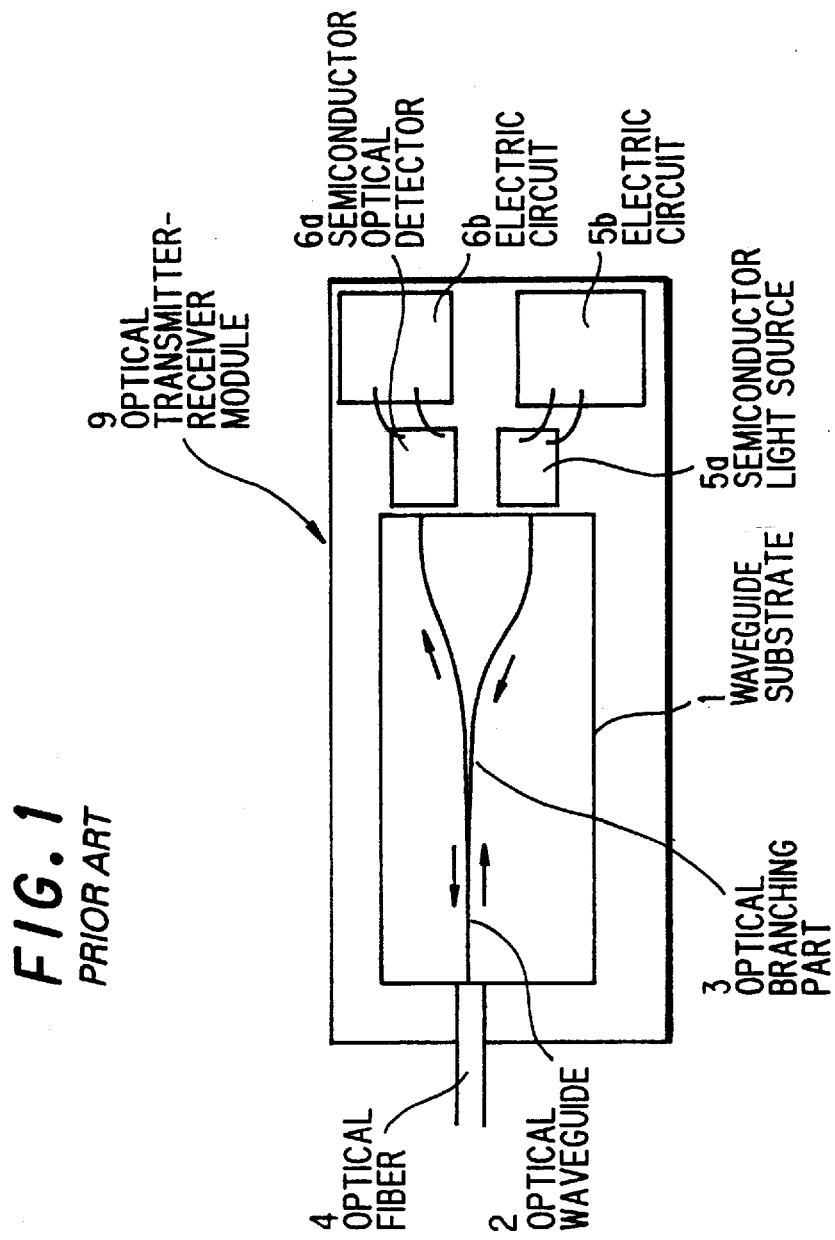
FIG. 1 is a plan view showing a conventional optical transmitter-receiver module.
Figure 2:
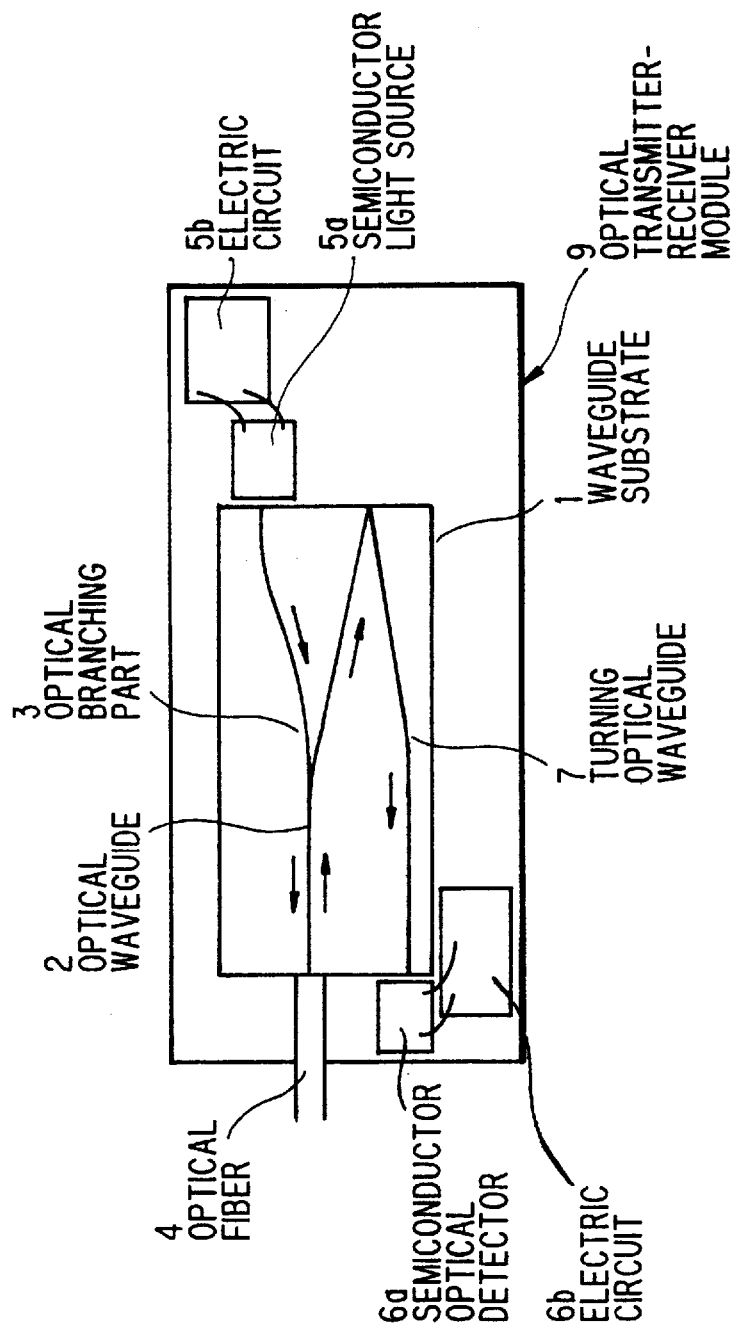
FIG. 2 is a plan view showing another conventional optical transmitter-receiver module.
Figure 3:
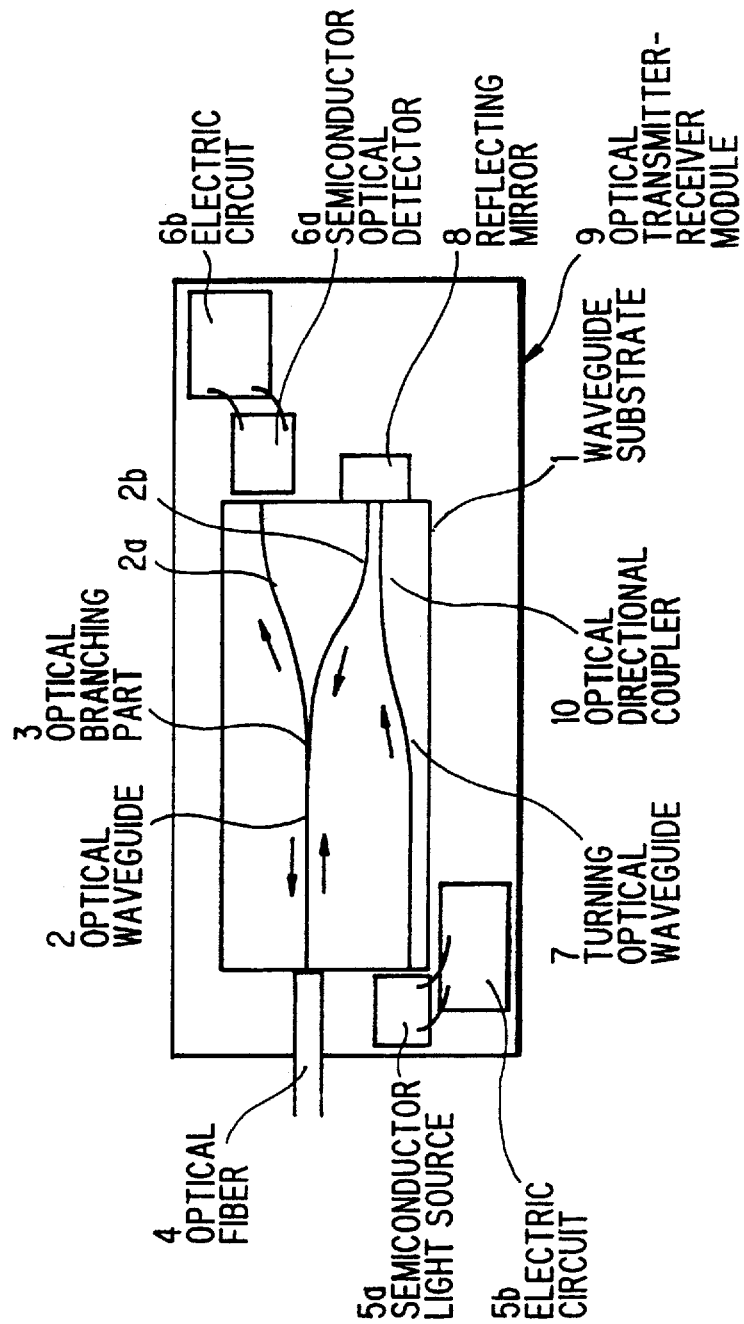
FIG. 3 is a plan view showing an optical transmitter-receiver module in a first preferred embodiment according to the invention.

An optical transmitter-receiver module in the first preferred embodiment will be explained in FIG. 3, wherein like parts are indicated by like reference numerals as used in FIGS. 1 and 2.

In the optical transmitter-receiver module 9, an optical waveguide 2 is, similarly to the conventional one, formed from one end surface to the other end surface of a waveguide substrate 1 and the optical waveguide 2 includes an optical branching part 3 which is formed by using a Y-branch with small propagation loss and a simple structure. Also, a turning optical waveguide 7 is disposed approximately in parallel with the optical waveguide 2 formed from one end surface to the other end surface of the waveguide substrate 1. One end of the turning optical waveguide 7 is disposed close to one optical waveguide 2b of the two optical waveguides branched by the optical branching part 3.

Further, an optical fiber 4 is optically connected to an end on the non-branched side of the optical waveguide 2. Also, a semiconductor optical detector 6a for reception is optically connected to the first optical waveguide 2a of the branched optical waveguides, where the first optical waveguide 2a is not close to the turning optical waveguide 7. In order to enhance the reflection efficiency, a reflecting mirror 8 is attached on the end surface of the waveguide substrate 1 where the respective ends of the second optical waveguide 2b and the turning optical waveguide 7 meet. A semiconductor light source 5a for transmission is optically connected to the other end of the turning optical waveguide 7. Adjacent to the semiconductor light source 5a and the semiconductor optical detector 6a, electric circuits 5b, 6b, respectively are disposed, then being electrically connected to each of them. Thus, by integrally assembling these components, the optical transmitter-receiver module 9 can be obtained. Herein, the reflecting mirror 8 is attached by adhering a material on which a reflecting film such as Au, Al, Ag or a dielectric multilayer film or the like is formed to the end surface of the waveguide substrate 1, or by adhering the reflecting film directly to the end surface of the waveguide substrate 1.

As explained above, in the composition of the optical transmitter-receiver module in the first embodiment, since the semiconductor light source 5a for transmission is disposed on the opposite side of the semiconductor optical detector 6a for reception, the limitation as to the space for arranging them can be relaxed, thereby the fabrication of the module is easy. Furthermore, since the electric circuits 5b, 6b of the semiconductor light source 5a and the semiconductor optical detector 6a, respectively are disposed apart from each other, the electrical crosstalk between them can be suppressed. Also, since it is not necessary for the distance between the two optical waveguides 2a, 2b to be extended, each of the optical waveguides does not need to be lengthened and the size of the entire optical transmitter-receiver module can therefore be kept small, Also, since the bending radii of the optical waveguide 2a, 2b does not need to be decreased, the waveguide loss of waveguided light caused by the reduction in the confinement of light into waveguide can be suppressed.

Moreover, in the first embodiment, since the branched second optical waveguide 2b is optically connected through the reflecting mirror 8 to the turning optical waveguide 7 and the semiconductor light source 5a for transmission is optically connected to the turning optical waveguide 7, even if the reflection loss at the reflecting mirror 8 or the loss caused by the extension of optical waveguide length by using the turning optical waveguide 7 occurs, a desired optical power can be output to the optical fiber 4 by increasing the power of the semiconductor light source 5a by controlling the optical transmitter-receiver module 9 itself to offset against the loss. Besides, since the semiconductor optical detector 6a for reception is optically connected to the branched first optical waveguide 2a with the shortest distance, the reception characteristic can be prevented from deteriorating.

Meanwhile, as mentioned before, the branched second optical waveguide 2b and the turning optical waveguide 7 are closely disposed approximately in parallel with each other at one end of the waveguide substrate 1, thereby to form an optical directional coupler 10. To enhance the optical coupling characteristic of the optical directional coupler 10, for example, the following method is available. Namely, in the optical directional coupler 10, the branched optical waveguide 2b and the turning optical waveguide 7 are optically connected by using the reflection of the reflecting mirror 8. In this case, if its sensitive factor such as a length or a clearance of the optical directional coupler 10, a width or a refractive index difference of the optical waveguide and an optical wavelength is offset from a preset value, an optical loss may be increased and, moreover, undesired reflecting-back of light through the waveguide through which the light was entered may occur, therefore deteriorating the characteristic of the semiconductor light source 5a.

Figure 4:
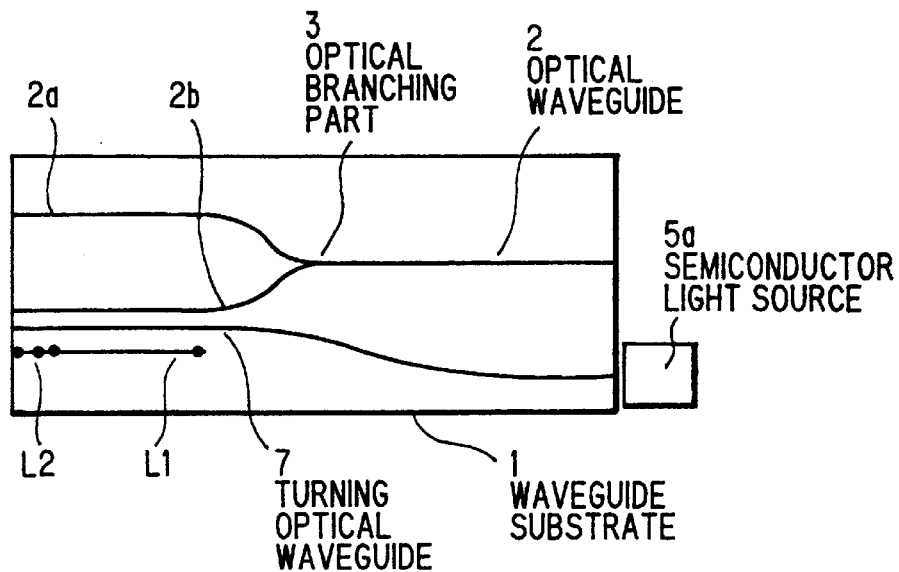
FIG. 4 is a plan view for explaining a technique for improving the characteristic of an optical directional coupler in FIG. 3.

To solve these problems and provide an optical directional coupler with a further reduced loss and reflecting-back light, as shown in FIG. 4, the length of the optical directional coupler can be in advance extended by L2, adding to a predetermined length L1. In this state, when the emission of light is observed before attaching the reflecting mirror 8 on the end surface for turning light, the emitting light from the end surface on the output side with the optical waveguide 7 must be more intensive than the emitting light from the end surface on the input side with the optical waveguide 2b. Then, as the end surface is polished to gradually shorten the length of the optical directional coupler 10 while observing the emission of light, the intensities of lights emitted from the turning optical waveguide 7 and the optical waveguide 2b will be equal to each other. When the intensities of emitted lights become completely equal, the polishing is stopped and the reflecting mirror 8 is then attached to the polished end surface. Thus, light to be input from the turning optical waveguide 7 on the input side can be completely turned to the optical waveguide 2b on the output side, thereby providing an optical directional coupler with a reduced loss and reflecting-back light. In this method, since an optimum length of optical directional coupler is determined while monitoring the intensity of emitted light on the end surface, the above-mentioned offset from a preset value can be corrected.

Figure 5:
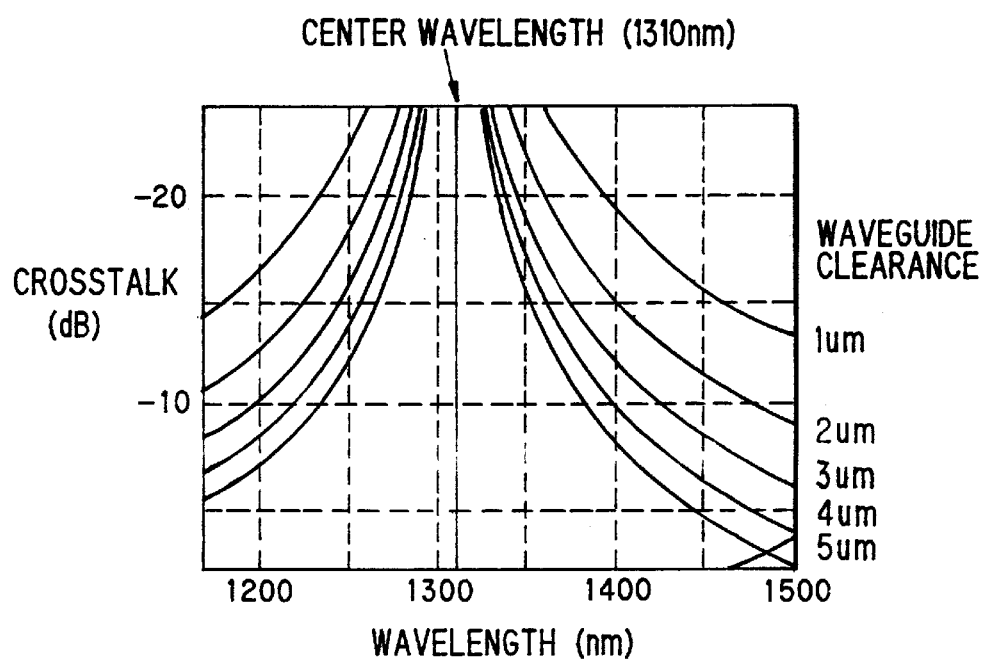
FIG. 5 shows calculated results as to a waveguide clearance-dependency in wavelength characteristics of an optical directional coupler.

As explained before, the light turning structure using an optical directional coupler is very sensitive to a refractive index difference of optical waveguide or an optical wavelength, and, in particular, an optical wavelength to be used is to be determined by the characteristic of a semiconductor light source to be used. In general, in such optical transmitter-receiver modules, a wavelength of 1.3 μm or so is used, in which there is a substantial dispersion of around ±0.05 μm. Namely, according to the characteristic of a semiconductor light source to be used, the characteristic of the turning optical waveguide is varied. Thus, it is necessary for the turning optical waveguide to be stable to an optical wavelength. FIG. 5 shows calculated results as to a waveguide clearance-dependency in wavelength characteristics of an optical directional coupler. To have a center wavelength of 1.31 μm, the length and refractive index difference of the optical directional coupler are determined. In FIG. 5, it will be appreciated that the dependency to a wavelength near 1.31 μm is reduced as the waveguide clearance is decreased. Thus, when the waveguide clearance is 4 μm or less, a crosstalk of 15 dB or more can be obtained to a variation of ±0.05 μm, therefore providing a turning optical waveguide stable to the variation of wavelength.

Figure 6:
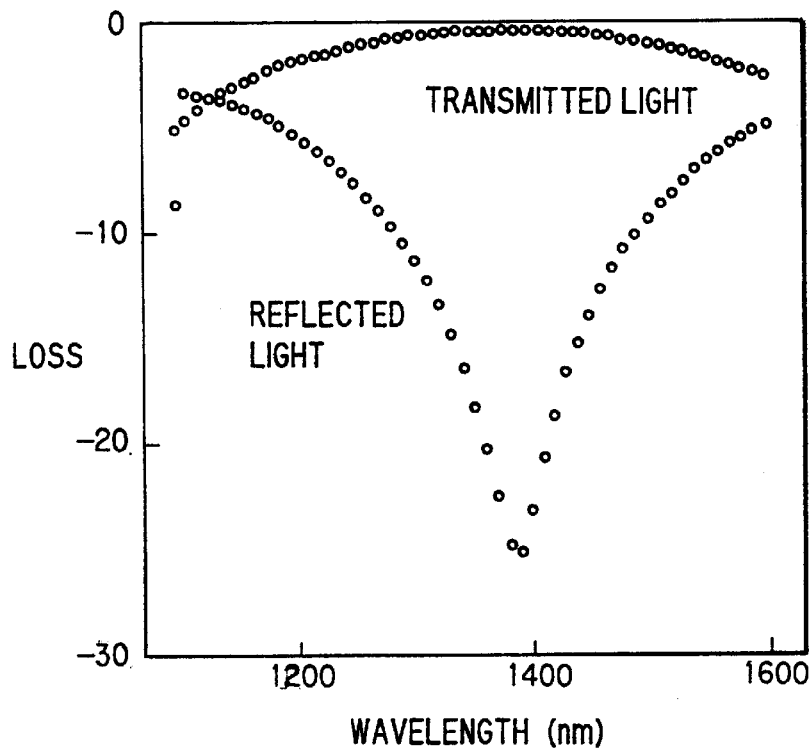
FIG. 6 shows an optical loss characteristic on a clearance of optical waveguides.

FIG. 6 shows a wavelength characteristic in case of actually forming a turning optical waveguide on the above characteristics, where the optical waveguide clearance is set to be 2.5 μm. Though, in this turning optical waveguide, the center wavelength is shifted to the longer wavelength side due to a variation in fabrication process, a crosstalk of 10 dB or more can be obtained at 1.31 μm. Thus, by forming an optical directional coupler on such technique, an optical waveguide which is stable not only to the variation of wavelength but also to the variation in fabrication process can be obtained.

Meanwhile, in such optical transmitter-receiver module, a positioning technique of optical fiber etc has been suggested, in which a V-groove is formed at a part of the waveguide substrate to assure an optical-axis-aligning precision of 1 μm or less when an optical fiber, a semiconductor light source and a semiconductor optical detector are connected with an optical waveguide formed on a waveguide substrate, and the optical fiber etc. is disposed in the V-groove. In this technique, with regard to the optical connection of the semiconductor optical detector and optical waveguide, a high-precision axis adjustment is not required since the light-receiving area of semiconductor optical detector is relatively big. On the other hands, with regard to the optical connection of the semiconductor light source and optical waveguide, it is known that, if they are directly connected, the loss is significantly increased, and that the optical connection is difficult due to a small amount of axis-offset to be allowed. Therefore, they are in general connected through a lens which has a shape similar to that of the optical fiber.

Figure 7:
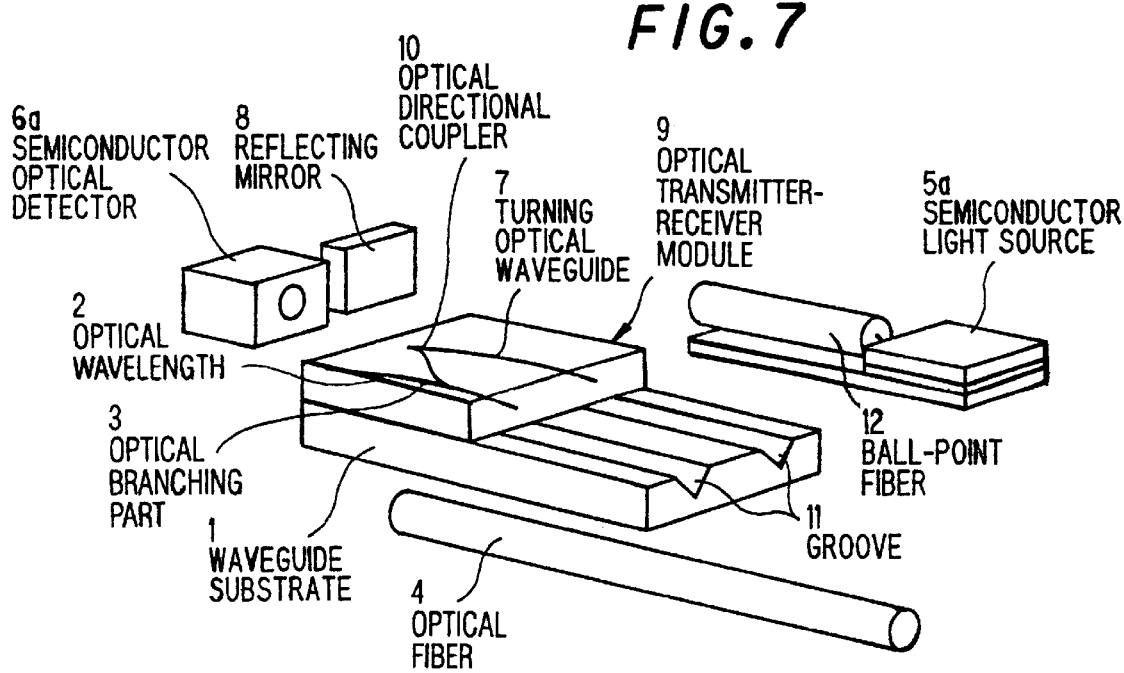
FIG. 7 is an exploded perspective view for explaining the optical axis positioning between an optical fiber and an optical waveguide in FIG. 3.

Also in the optical transmitter-receiver module 9 in the first embodiment, as shown in FIG. 7, V-grooves 11 are formed on one end of the waveguide substrate 1, where the optical fiber 4 and the semiconductor light source 5a are disposed and optically connected with the optical waveguides 2 and turning optical waveguide 7, respectively. By using the V-grooves 11, the optical fiber 4 positioned to the non-branched optical fiber 2 and the ball-point fiber 12 optically connected to the semiconductor light source 5a is positioned to the turning optical waveguide 7. Thus, the optical axes of the optical fiber 2 and the ball-point fiber 12 can be highly precisely positioned to the optical waveguides 2 and 7, respectively, thereby achieving a small loss in optical connection and a low cost by mounting with no adjustment. Furthermore, in this embodiment, since the optical fiber 4 and the semiconductor light source 5a are disposed on the same side of the waveguide substrate 1, both the V-grooves 11 can be parallel formed on one end of the waveguide substrate 1, thereby achieving an easy fabrication and providing a smaller device, as well as facilitating the mounting of the optical fiber and semiconductor light source.

Figure 8:
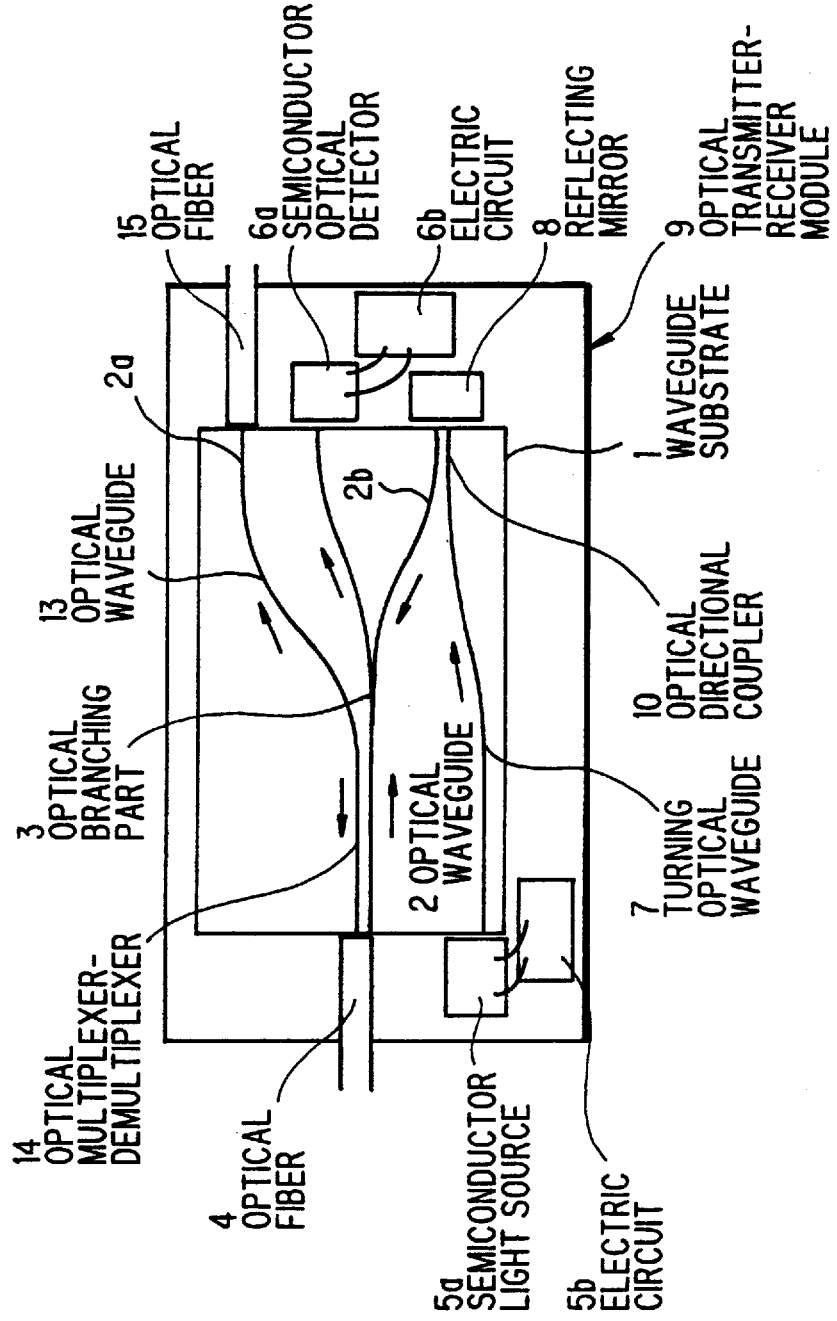
FIG. 8 is a plan view showing an optical transmitter-receiver module in a second preferred embodiment according to the invention.

An optical transmitter-receiver module in the second preferred embodiment according to the invention will be explained in FIG. 8, wherein like parts are indicated by like reference numerals as used in FIGS. 1 to 3.

In the second embodiment, another optical waveguide 13 is formed along a part of the non-branched optical waveguide 2, thereby an optical multiplexer-demultiplexer 14 being formed of the optical waveguides 2 and 13. In general, the optical multiplexer-demultiplexer 14 is composed of an optical directional coupler, a Mach-Zehnder optical interferometer or the like. One light demultiplexed from the optical multiplexer-demultiplexer 14 is lead to an optical fiber 15 and is then output to be supplied to various uses such as monitoring of an image signal etc. Though the size of the optical transmitter-receiver module which is provided with such optical multiplexer-demultiplexer must be bigger than that of the optical transmitter-receiver module in the first embodiment due to the complicated waveguide structure, an increase in size can be suppressed by employing the turning optical waveguide.

An optical transmitter-receiver module in the third preferred embodiment according to the invention will be explained in FIG. 9, wherein like parts are indicated by like reference numerals as used in FIGS. 1 to 3.

Figure 9:
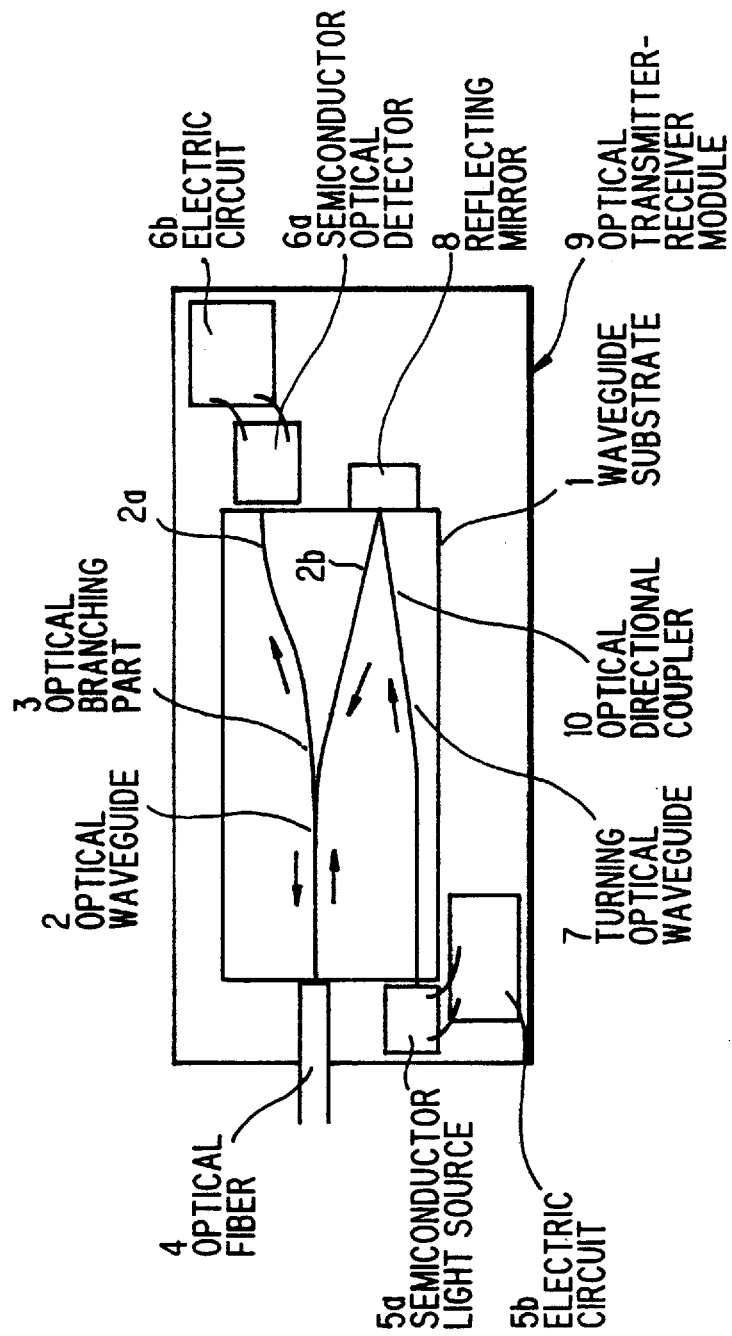
FIG. 9 is a plan view showing an optical transmitter-receiver module in a third preferred embodiment according to the invention.

In the third embodiment, as shown in FIG. 9, the optical waveguides 7 and 2b are disposed such that they have a V-formation on one end of the waveguide substrate 1, and the reflecting mirror 8 is attached to the end surface of the waveguide substrate 1. Thus, the optical connection of the turning optical waveguide 7 and the optical waveguide 2 can be given by using only the reflection by the reflecting mirror 8. The other composition and operation are similar to those in the above embodiments.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical transmitter-receiver module, in which an optical waveguide with an optical dividing function is formed from a first end to a second end of a waveguide substrate, and the non-branched side of said optical waveguide is optically connected to an optical fiber at said first end of said waveguide substrate, and two optical waveguides on the branched side of said optical waveguide are optically connected to an optical transmitter and an optical receiver, respectively, wherein a first optical waveguide of said two optical waveguides is optically connected to said optical receiver at said second end of said waveguide substrate, and a second optical waveguide of said two optical waveguides comprises a turning optical waveguide which is turned back from said second end to said first end of said waveguide substrate, and said turning optical waveguide is optically connected to said optical transmitter at said first end of said waveguide substrate; and wherein another optical waveguide which composes an optical multiplexer-demultiplexer with said non-branched side of said optical waveguide is formed, and said another optical waveguide is optically connected to another optical fiber.

2. An optical transmitter-receiver module, according to claim 1, wherein:

said second optical waveguide and said turning optical waveguide are closely disposed on said second end of said waveguide substrate and are formed as an optical directional coupler in which they are optically connected by using a reflecting means disposed on an end surface of said second end of said waveguide substrate.

3. An optical transmitter-receiver module, according to claim 2, wherein:

the length of said optical directional coupler is determined such that the amount of light emitted from said second optical waveguide at said second end of said waveguide substrate is equal to the amount of light emitted from said turning optical waveguide.

4. An optical transmitter-receiver module, according to claim 3, wherein:

the clearance of said second optical waveguide and said turning optical waveguide in said optical directional coupler is set to be 4 $\mu$m or less.

5. An optical transmitter-receiver module, according to claim 2, wherein:

the clearance of said second optical waveguide and said turning optical waveguide in said optical directional coupler is set to be 4 $\mu$m or less.

6. An optical transmitter-receiver module, comprising a waveguide substrate having an optical waveguide formed thereon, a first portion of said optical waveguide being connected at a first end of said waveguide substrate to an optical fiber, said first portion being branched in an intermediate region of said waveguide substrate to form second and third branched portions of said optical waveguide reaching a second opposite end of said waveguide substrate, said second branched portion communicating with a semiconductor optical detector disposed adjacent said second end of said waveguide substrate, and said third branched portion communicating with a reflective element disposed adjacent said second end of said waveguide substrate, said optical waveguide further comprising a fourth waveguide portion extending from said first end to said second opposite end of said waveguide substrate separately from said first and third portions, and optically communicating at said second end of said substrate with both said third waveguide portion and said reflective element and optically communicating at said first end of said substrate with a semiconductor light source disposed adjacent said first end of said substrate.

7. The optical transmitter-receiver module according to claim 6, wherein said third and fourth waveguide portions are formed closely adjacent to one another at said second end of said waveguide substrate, thereby to form an optical directional coupler connected by said reflective element.

8. The optical transmitter-receiver module according to claim 7, wherein said third and fourth waveguide portions are spaced apart in the vicinity of said second end of said substrate by a distance of 4 $\mu$m or less.

9. The optical transmitter-receiver module according to claim 6, further comprising an additional optical waveguide separately formed on said waveguide substrate, and optically communicating at said first end of said waveguide substrate with said optical fiber, and at said second end of said waveguide substrate with an additional optical fiber.

10. An optical transmitter-receiver module, comprising a waveguide substrate having an optical waveguide formed thereon, a first portion of said optical waveguide being connected at a first end of said waveguide substrate to an optical fiber said first portion being branched in an intermediate region of said waveguide substrate to form second and third branched portions of said optical waveguide reaching a second opposite end of said waveguide substrate, said second branched portion communicating with a semiconductor optical detector disposed adjacent said second end of said waveguide substrate, and said third branched portion comprising a turning portion extending from said second end to said first end of said waveguide substrate and optically communicating at said first end of said substrate with a light source disposed adjacent said first end of said substrate.

* * * * *